US009755925B2

(12) United States Patent
Poola et al.

(10) Patent No.: US 9,755,925 B2
(45) Date of Patent: Sep. 5, 2017

(54) EVENT DRIVEN METRIC DATA COLLECTION OPTIMIZATION

(71) Applicant: ORACLE INTERNATIONAL CORPORATION, Redwood Shores, CA (US)

(72) Inventors: Thyagaraju Poola, Sunnyvale, CA (US); Venkata Ramana Karpuram, Fremont, CA (US); Vladimir Volchegursky, Redwood City, CA (US); Madeline Mirzoeff, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 418 days.

(21) Appl. No.: 14/486,168

(22) Filed: Sep. 15, 2014

(65) Prior Publication Data

US 2016/0080226 A1     Mar. 17, 2016

(51) Int. Cl.
*G06F 17/00* (2006.01)
*H04L 12/26* (2006.01)
*H04L 29/08* (2006.01)
*H04L 12/24* (2006.01)

(52) U.S. Cl.
CPC ............ *H04L 43/08* (2013.01); *H04L 41/069* (2013.01); *H04L 67/10* (2013.01); *H04L 41/0266* (2013.01); *H04L 41/12* (2013.01)

(58) Field of Classification Search
CPC .......... G06F 17/3053; G06F 17/30598; G06F 9/4881; G06F 9/4887; G06F 9/5083; G06F 11/0709
See application file for complete search history.

(56) References Cited

U.S. PATENT DOCUMENTS

| | | | |
|---|---|---|---|
| 7,117,197 B1 | 10/2006 | Wong et al. | |
| 7,127,448 B1 | 10/2006 | Wong | |
| 7,228,304 B1 | 6/2007 | Wong et al. | |
| 7,814,075 B2 | 10/2010 | Sack et al. | |
| 8,204,861 B2 | 6/2012 | Sondhi et al. | |
| 2003/0204474 A1* | 10/2003 | Capek | G06Q 10/109 705/64 |
| 2011/0072030 A1 | 3/2011 | Wong | |
| 2012/0131057 A1 | 5/2012 | Youn et al. | |
| 2014/0222745 A1* | 8/2014 | Deng | G06N 7/005 706/47 |

* cited by examiner

*Primary Examiner* — Truong Vo
(74) *Attorney, Agent, or Firm* — Cooper Legal Group, LLC

(57) ABSTRACT

Systems, methods, and other embodiments associated with event driven metric data collection optimization are described. In one embodiment, a method includes providing a domain knowledge catalog that defines, for each of a plurality of source metrics: i) a plurality of target type relationships and ii) for each target type relationship, a plurality of metrics that are related to the source metric. For a particular system, a deployment topology is determined defines target entities that are included in the system, where the target entities comprise respective instances of a subset of the target type relationships. The method includes receiving configuration of an event related to a source metric. The domain knowledge catalog is accessed and metrics that are related to the subset of target type relationships for the source metric are selected for collection.

20 Claims, 7 Drawing Sheets

200

Domain Knowledge Catalog

```xml
<SourceMetric MetricName="deployment_overview" MetricColumn="service.totalTime" >
    <AssocTarget TargetType="j2ee_application" >
        <!-- These are the metrics on the same target instance. Note that there
             is no Association attribute if the related metric are on the same
             target -->
        <RelatedMetric MetricName="deployment_servlet_jsp"
                       MetricColumn="service.totalTime" MetricKeys="name" />
        <RelatedMetric MetricName="deployment_overview"
                       MetricColumn="service.time" />
    </AssocTarget>
    <AssocTarget TargetType="weblogic_j2eeserver" Association="managedServer" >
        <!-- These are the metrics on the weblogic_j2eeserver target
             instance with a relationship as a managedServer between
             j2ee_application and weblogic_j2eeserver -->
        <RelatedMetric MetricName="jvm" MetricColumn="cpuUsage.percentage" />
        <RelatedMetric MetricName="jvm_memory_usage"
                       MetricColumn="heapMemoryUsed.value" />
        <RelatedMetric MetricName="server_overview"
                       MetricColumn="service.throughput" />
        <AssocTarget TargetType="host" Association="*" >
            <!-- These are the metrics on the host target instance with a
                 relationship between j2ee_application and host as j2ee_application
                 with managedServer Association and then weblogic_j2eeserver with *
                 (* means no assoc name checking done) with host -->
            <RelatedMetric MetricName="Load" MetricColumn="cpuUtil" />
        </AssocTarget>
    </AssocTarget>
</SourceMetric>
```

FIG. 2

EVENT DRIVEN METRIC DATA COLLECTION OPTIMIZATION

BACKGROUND

An enterprise system is a collection of "managed targets" that are managed by the enterprise management system. A managed target is a target or entity on which a management agent has been deployed. Example targets include host computing machines, databases, middleware applications, and so on. Each target is an instance of a target type implemented on a computing component (e.g., Weblogic server, J2EE application, and so on). Management of a target includes the ability to collect data on various metrics that correspond to measures of attributes of the target. Example metrics include service time, CPU usage, memory usage, and so on.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 2 illustrates an example domain knowledge catalog.

DETAILED DESCRIPTION

Figure 1:
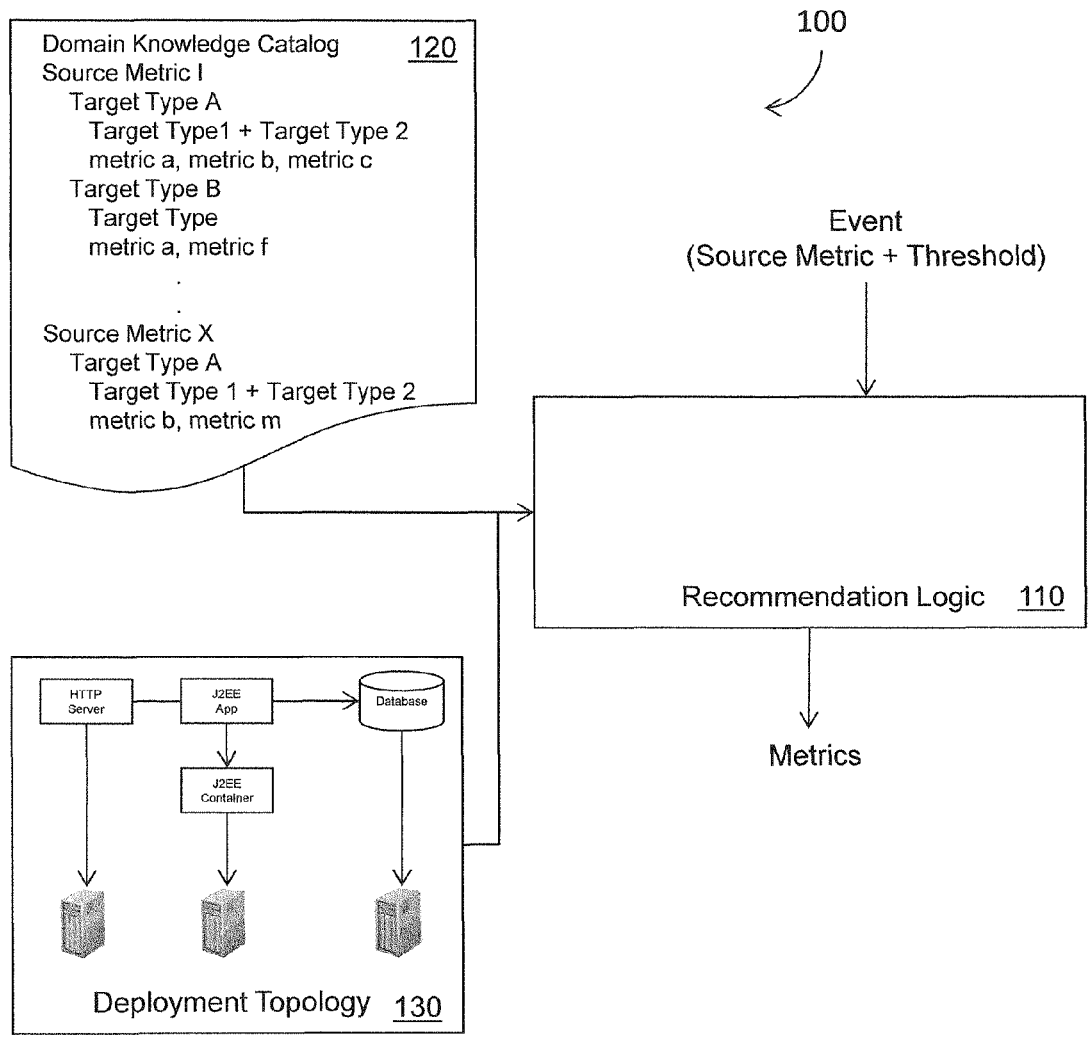
FIG. 1 illustrates one embodiment of a system that provides event driven metric data collection optimization.

In large enterprise systems, especially cloud deployments, there may be tens of thousands of managed targets. Enterprise system administrators often rely on events that are generated when metrics violate user defined thresholds to manage the health, usage, and performance of the enterprise system. If all possible metrics for all enterprise system components are collected, excessive amounts of data must be stored and managed. To store this data, administrators obtain additional management and storage servers, which can be costly. The administrators must also find new ways to manage the data and to address the data's lifecycle. Having large amounts of data can create misleading noise that hampers the effort to triage system problems such as performance bottlenecks and system outages.

Due to the overwhelming amount of data produced by extensive monitoring of enterprise system metrics, administrators tend to disable the collection of data on most metrics. However, the selection of which metrics to cease monitoring may not be based on a complete understanding of how the various metrics interact. Thus when a problem occurs, data for all relevant metrics may not be available for use in troubleshooting. Further exacerbating the problem, administrators often reduce the collection rate of those metrics that are being monitored to reduce the amount of data that must be stored and processed. The low collection rates produce insufficient data to understand the root cause of problems that arise.

For example, in a complex business application, there may be a "backlog" source metric that is derived from "orders received" and "orders shipped" metrics. A source metric is a metric that has been selected by a user to form the basis of an event. The user specifies a threshold for the source metric and the enterprise management agent on the target generates an event when the source metric exceeds (or falls below) the threshold. The "backlog" source metric generates an event when the number of orders shipped drops significantly in relation to the number of orders received. "Orders shipped" is based on the "requests processed" metric on a Java 2, Enterprise Edition (J2EE) shipping application. A drop in the requests (measured as a metric) being shipped could be because pages in the shipping application are not performing due to Java Virtual Machine (JVM) heap issues, out of memory issues, stuck thread issues, or other Weblogic server's general health indicators, all of which are collected as metrics on the Weblogic server target. Even when metric collection is enabled for the shipping application, if the Weblogic server's metric collection is turned off, data for the metrics necessary to diagnose the cause of the event will not be available.

Systems and methods are described herein that automatically recommend which metrics should be collected for a given source metric and a given enterprise system deployment. In one embodiment, an appropriate collection frequency for the recommended metrics is also determined. The systems and methods described herein provide an automated solution for recommending metric collection and collection frequencies for a customer's specific enterprise system based on the customer's selected events. The automated solution can quickly adapt the recommended metrics and collection frequencies as the enterprise system changes. While the following description will be in the context of an enterprise system, the systems and methods herein can be applied in any computing system in which metrics are collected.

FIG. 1 illustrates one embodiment of a system 100 configured to recommend metrics for collection on a deployed enterprise system. The system 100 includes recommendation logic 110 configured to select metrics for collection based on a user defined event. The user defines an event by selecting a source metric and a threshold value for the metric. The recommendation logic 110 is configured to access a domain knowledge catalog 120 and a deployment topology 130.

The domain knowledge catalog 120 defines, for each of a plurality of source metrics: i) a plurality of target type relationships and ii) a plurality of metrics for each target type relationship. A target type relationship includes a collection of one or more target types that cooperate to instantiate a target entity in an enterprise system. For each target type relationship, the domain knowledge catalog 120 specifies a plurality of metrics that are related to the source metric. A metric corresponds to a measure of an attribute (e.g., activities, states, counts) of a target. A target's metrics represent the target's availability, capacity, usage, performance, and so on. Each target has many metrics that can be collected.

Referring to the generalized domain knowledge catalog 120 of FIG. 1 it can be seen that the domain knowledge catalog includes metric data for source metrics I-X. For source metric I, two target type relationships (target type A and target type B) are defined. Target type A is defined as target type 1 combined with target type 2. For target type A, three metrics a, b, c are defined. Thus when source metric I is selected and a customer's deployment includes target type A, metrics a, b, c will be recommended for collection.

FIG. 2 illustrates a portion of a domain knowledge catalog 200. In the illustrated embodiment, the domain knowledge catalog 200 is an XML document that compiles an exhaustive list of source metrics and target type relationships for many possible enterprise system environments. The illustrated portion of the domain knowledge catalog 200 defines metrics that should be collected when a source metric "service.totalTime" is selected to generate an event. Two target type relationships are defined, i) target type "J2ee_application" and ii) target type "weblogic_j2eeserver" associated as "managedServer" with target type "host."

When the target type is "J2ee_application" the domain knowledge catalog 200 specifies that two metrics should be recommended for collection: i) "service.totalTime" found in table "deployment servlet isp" and ii) "service.time" found in table "deployment overview".

When the target type is "Weblogic-j2eeserver" and "host" to a J2EE application, the domain knowledge catalog 200 specifies that four metrics should be recommended for collection: i) "cpuUsage.percentage" found in table "jvm"; ii) "heapMemoryUsed.value" found in table "jvm memory usage"; iii) "service.throughput" found in table "server overview"; and iv) "cpuUtil" found in table "Load".

Note that the domain knowledge catalog 200 will likely include additional target type relationships for source metric "service.totalTime", which are not shown in FIG. 2 for simplicity sake.

Recall from FIG. 1 that the recommendation logic 110 recommends metrics for collection based on the enterprise system's deployment topology 130. The deployment topology 130 defines the particular targets that are included in the enterprise system. The targets in the deployment topology are instances of a subset of the target type relationships defined in the domain knowledge catalog 120. In one embodiment, the deployment topology 130 is determined using an automatic target discovery process configured to discover targets in an enterprise system.

Figure 3:
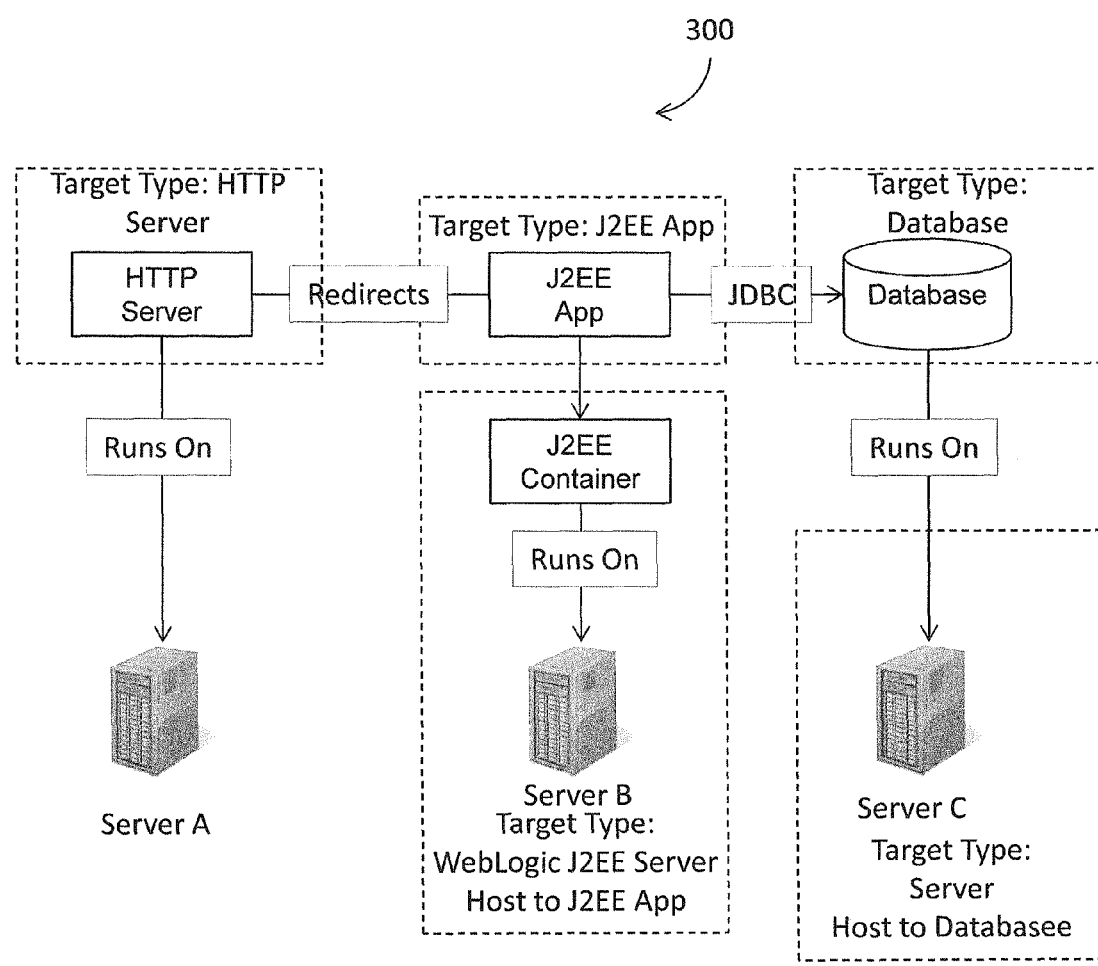
FIG. 3 illustrates an example deployment topology.

FIG. 3 illustrates an example deployment topology 300. The deployment topology 300 includes three servers A, B, C. Server A is an HTTP server that redirects to a Weblogic J2EE server instantiated on server B. The Weblogic J2EE server hosts a J2EE application that processes queries on a database that runs on server C. The J2EE application is deployed in a J2EE container on server B.

Various components of the deployment topology 300 are labeled with their target types. The recommendation logic 110 is configured to determine the target types included in the deployment topology as well as the relationships between the target types. The relationships between target types may be determined during an automatic enterprise system target discovery process. The recommendation logic 110 determines that the deployment topology 130 includes a J2EE application deployed in a J2EE container running on (or hosted by) a Weblogic J2EE server B and that the J2EE application processes data from a database hosted by server C.

By way of example, the deployment topology shown in FIG. 3 could implement a J2EE shopping cart application. The user clicks on a search page. The request comes to the HTTP Server that redirects to the J2EE application that is deployed on the Weblogic Server. The J2EE application makes a call to the database for a list of products that match the search criteria. The J2EE application also makes a call to another database to get the review rating for each of the products in the search result. The J2EE combines the review ratings with the product results and returns them as a page for the user to view.

The user selects a few products and then clicks the "purchase" button on the page. The request is sent to the HTTP Server that redirects to the J2EE application. The J2EE application saves the product in the database and makes a request to a web service to process the credit card information. The web service returns confirmation of successful processing of the credit card. The J2EE application submits the purchase information to the shipping application. Then, the J2EE returns a page to the user that shows that the purchase was successful.

Returning to FIG. 1, the recommendation logic 110 is configured to receive configuration of an event and to select metrics for monitoring by accessing the domain knowledge catalog 120 and selecting metrics that are related to the target type relationships in the deployment topology 130. Given the domain knowledge catalog 200 of FIG. 2 and the deployment topology 300 of FIG. 3, and a user configured event of "service.totalTime" of the J2EE application, the recommendation logic 110 will recommend the following metrics for monitoring: i) "service.totalTime" found in table "deployment servlet jsp"; ii) "service.time" found in table "deployment overview"; iii) "cpuUsaqe.percentage" found in table "jvm"; iv) "heapMemoryUsed.value" found in table "jvm memory usage"; v) "service.throughput" found in table "server overview"; and vi) "cpuUtil" found in table "Load".

Note that the metrics that are recommended include metrics on the server hosting the J2EE application whose metric is the source metric "service.totalTime". The recommended metrics include metrics that are not immediately related to the J2EE application, the collection of which might have been disabled by an administrator unaware of the relationship between the application and the server. Note also that no metrics associated with the database or server C are recommended for collection. Metrics for the database and the server C may have been collected by an administrator based on a mistaken belief that these components affect "service.totalTime", resulting in the collection, storage, and processing of unnecessary metric data. The recommended metrics for an event provided by the recommendation logic 110 represent a highly tailored set of metrics selected in appreciation of the deployment topology and the particular source metric that generates the event.

Figure 4:
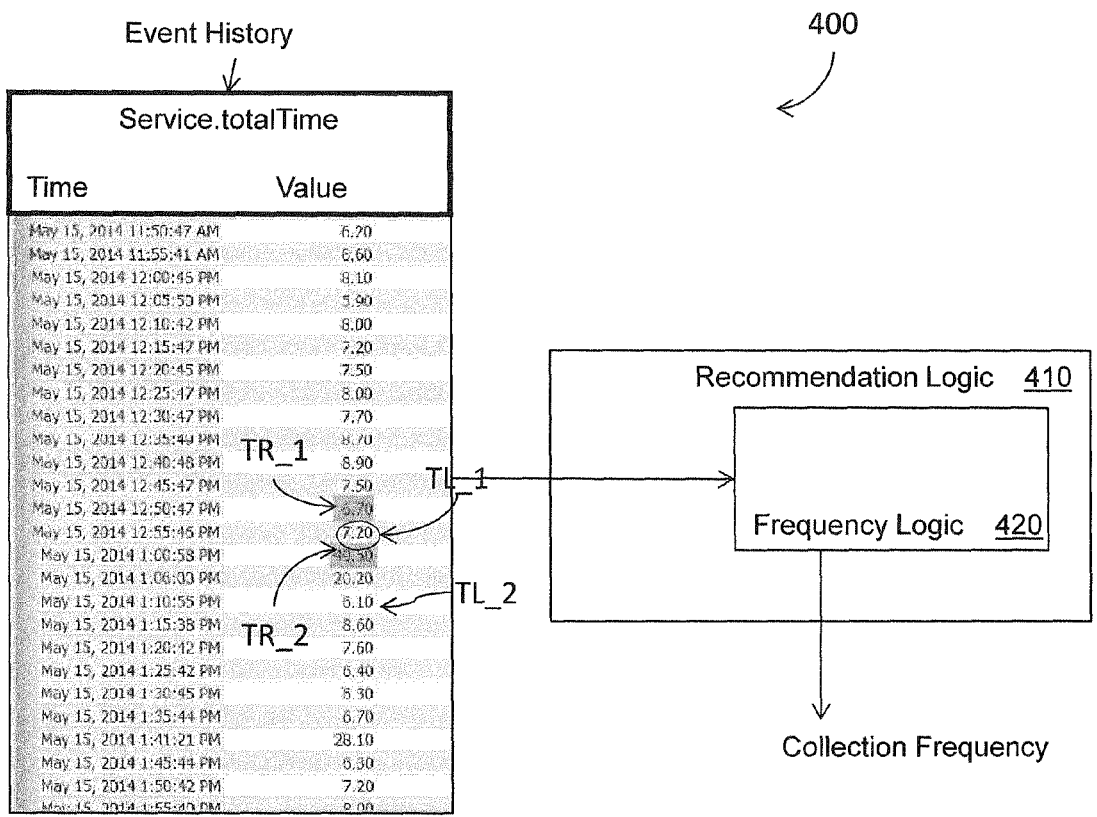
FIG. 4 illustrates an embodiment of a system that determines recommended metric collection frequencies.

FIG. 4 illustrates one embodiment of a system 400 that recommends a collection frequency for metrics based on historical information about events to which the metrics are related. The system 400 includes recommendation logic 410 that functions in a similar manner to the recommendation logic 110 of FIG. 1 and selects metrics for monitoring. The recommendation logic 410 includes frequency logic 420 that determines a collection frequency for metrics that the recommendation logic 110 selects for monitoring. While the frequency logic 420 is shown as a subcomponent of the recommendation logic 410, in one embodiment the frequency logic 420 is an independent logic that inputs historical event data and determines a collection frequency for a metric or metrics that are related to the event.

Collection frequencies are determined by the frequency logic 420 on a per event basis, and a recommended collection frequency for a given event is recommended for all metrics that are related to the event. Thus, returning to FIG. 1, a collection frequency that is determined for an event involving source metric I and a deployment topology that includes target type relationship A will be recommended for metrics a, b, and c. Another collection frequency determined for source metric X and target type relationship A will be recommended for metrics b and m. Note that metric b is related to more than one event. A minimum collection frequency selected from collection frequencies determined for all events to which a metric is related will be recommended for the metric. Thus if the collection frequency for source metric I is 30 seconds and the collection frequency for source metric X is 45 seconds, a collection frequency of 30 seconds will be recommended for metric b. For example, for a source metric of "response time" on a target type of Application, related metrics would include the CPU and memory usage of the Weblogic server hosting the application and JVM heap usage.

In one embodiment, the frequency logic 420 periodically (e.g., after a predetermined analysis period) re-determines collection frequencies for the events configured for an enterprise system. This automatic, periodic update approach allows the frequency logic 420 to adapt the collection frequencies as the enterprise system environment changes. If an event is occurring more often, the collection frequency for metrics related to the event may be collected more often. Likewise, when system issues are addressed and an event occurs less often, metrics associated with that event may be collected less often.

The frequency logic 420 inputs historical event data taken during the predetermined analysis period (e.g., one month). The analysis period for an event can be adjusted based on how often an event occurs, such that the analysis period for often occurring events may be shorter than the analysis period for less frequent events. An event is raised when the event's source metric value goes above (or falls below) a threshold value. The period from the time at which an event is raised to the time at which the event is cleared is the "life" of the event.

A minimum allowable collection frequency is established based on technical feasibility, performance impact, storage cost, and so on, that affect the cost of metric collection and load management by the enterprise system. In one embodiment, the default minimum collection frequency is one minute. A minimum number of data points (MDP) is also established based on the number of data points needed to fit a given statistical model in a meaningful way. In one embodiment, the default MDP is ten.

The frequency logic 420 is configured to determine a collection frequency for a metric that will provide sufficient data for statistically analyzing enterprise system problems related to a given event. The collection frequency is based on an understanding of the behavior of the metrics derived from historical event data. The frequency logic 420 uses distributions of metric values from two time regions in the context of each event occurrence to support statistical analysis of problems related to the event. The two time regions are i) the event life and ii) the run up to the occurrence of the event.

The event life is defined as the time between i) the time when the source metric value first exceeds the threshold (TL_1), or when the event is generated, and ii) the time when the source metric dropped below the threshold value (TL_2), or when the event is cleared.

The run up time period corresponds to the time period during which the source metric starts increasing in value and eventually violates the threshold. The run up time period is defined as the period between i) the time at which the source metric is at a minimum (TR_1) prior to a threshold violation and ii) a time at which the source metric reaches a first peak value (TR_2). The run up period represents the full time period of the run up of the source metric values from an acceptable value to a high point of the source metric values.

For each event of a given type, the frequency logic 420 selects all events that occurred during the analysis period and, for each occurrence, computes two sampling rates: an "event life" (EL) sampling rate and a "run up" (RU) sampling rate. The EL sampling rate is determined as the event's life time divided by the minimum number of data points required to fit the desired model or:

$$\text{EL sampling rate} = (TL\_2 - TL\_1)/MDP \qquad \text{EQ1}$$

The RU sampling rate is determined as the event's run up time period divided by the minimum number of data points required to fit the desired model or:

$$\text{RU sampling rate} = (TR\_2 - TR\_1)/MDP \qquad \text{EQ2}$$

The collection frequency for the event is then determined as the minimum of the predetermined minimum allowable collection frequency and the sampling rates (EL and RU) calculated for all the events in the analysis period. This collection frequency will be recommended for all metrics that are related to the event.

By way of example, note that FIG. 4 includes a table that represents historical data about the source metric "service.totalTime". An event has been configured by the user that is triggered when "service.totalTime" exceeds a value of 7.00. Although a computation of the EL sampling rate and the RU sampling rate will be made for all events in which "service.totalTime" exceeds 7.00, the example given will relate to the the event triggered by the reading that is circled, which occurred at 12:55 PM.

TL_1 is 12:55 because the event occurred at 12:55 when the metric value was 7.20. TL_2 is 13:10 because the event cleared at 13:10 (time is converted to twenty-four hour time for calculations) when the metric value was 6.10. TR_1 (shaded) is 12:50 because that is the time of first minimum value (6.70) before the threshold was violated. TR_2 (shaded) is 13:00 because that is the time the metric reached its peak (49.50). For the event at hand:

$$\text{EL sampling rate} = (13{:}10 - 12{:}55)/10(\text{default value}) = 1 \text{ minute 30 seconds}$$

$$\text{RU sampling rate} = (13{:}00 - 12{:}50)/10(\text{default value}) = 1 \text{ minute}$$

Assuming the minimum allowable collection frequency is not less than 1 minute, the frequency logic 420 will recommend a collection frequency of 1 minute for the metric "service.totalTime". A collection frequency of 1 minute will also be recommended for all the "service.totalTime" event-related metrics (e.g., "i) "service.time"; ii) "cpuUsage.percentage"; iii) "heapMemoryUsed.value"; iv) "service.throughput"; and v) "cpuUtil").

Figure 5:
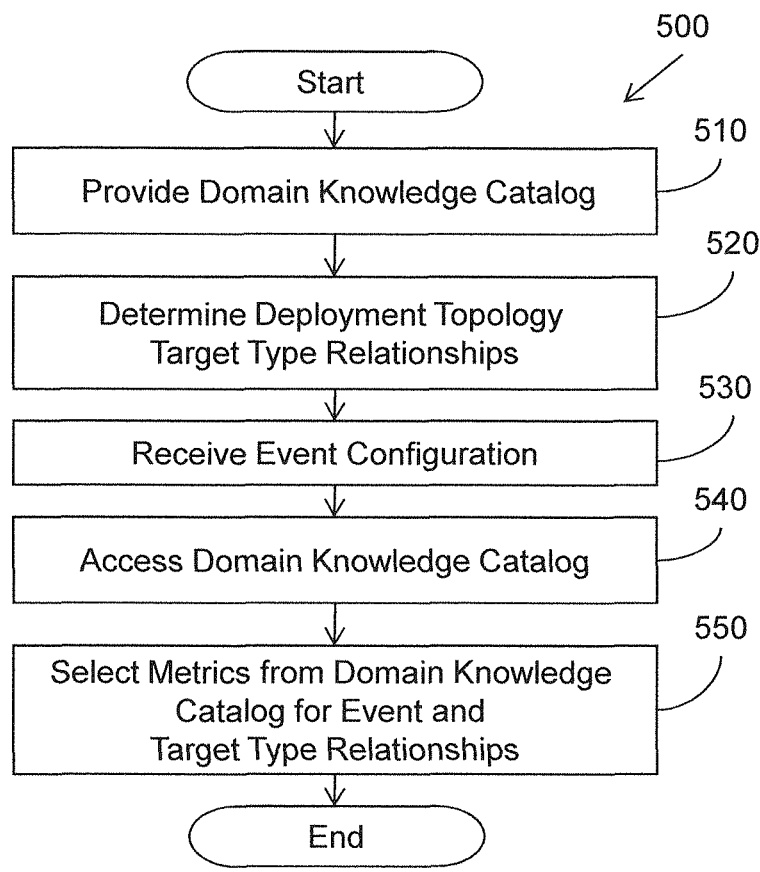
FIG. 5 illustrates another embodiment of a method associated with event driven metric data collection optimization.

FIG. 5 illustrates one embodiment of a method 500 for recommending metrics for collection in an enterprise system. The method 500 may be performed by the recommendation logics 110 and 410 of FIGS. 1 and 4, respectively. The method 500 includes, at 510, providing a domain knowledge catalog. An example of a domain knowledge catalog can be seen in FIG. 2. The domain knowledge catalog defines, for each of a plurality of source metrics: i) a plurality of target type relationships and ii) for each target type relationship, a plurality of metrics that are related to the source metric. In one embodiment, the domain knowledge catalog is compiled by defining target type relationships and metric relationships. The metric-to-metric relationships of the target type relationships are determined by overlaying the target type relationships on the metric relationships.

At 520, the method 500 includes determining, for a particular enterprise system, a deployment topology that defines target entities that are included in the enterprise system, where the target entities comprise respective instances of a subset of the target type relationships. An example of a deployment topology can be found in FIG. 3. In one embodiment, the deployment topology is determined using associations that were created during an enterprise manager target discovery process which set forth the topology of the component/target instances and the relationships of deployed applications. A metric relationship map for the enterprise system is developed by overlaying domain knowledge of metric relationships on the instance specific metrics.

At 530, the method includes receiving configuration of an event related to a selected source metric. At 540, the method includes accessing the domain knowledge catalog; and at 550, selecting metrics that are related to the subset of target type relationships for the source metric. In one embodiment, an enterprise system blueprint can be developed by overlaying the events configured by users on the metric relationship map. The blueprint is used to recommend metrics for collection and also gives an overall enterprise view on managing the metric collection life cycle. The blueprint can illustrate a topology of metrics that should be collected at a per event level and also at a consolidated view level. Anytime an event is changed, applications are deployed, or the infrastructure components are added or removed, the blueprint can be regenerated. In one embodiment, a computing device is implemented with an executable algorithm that is configured to perform the method 500.

Figure 6:
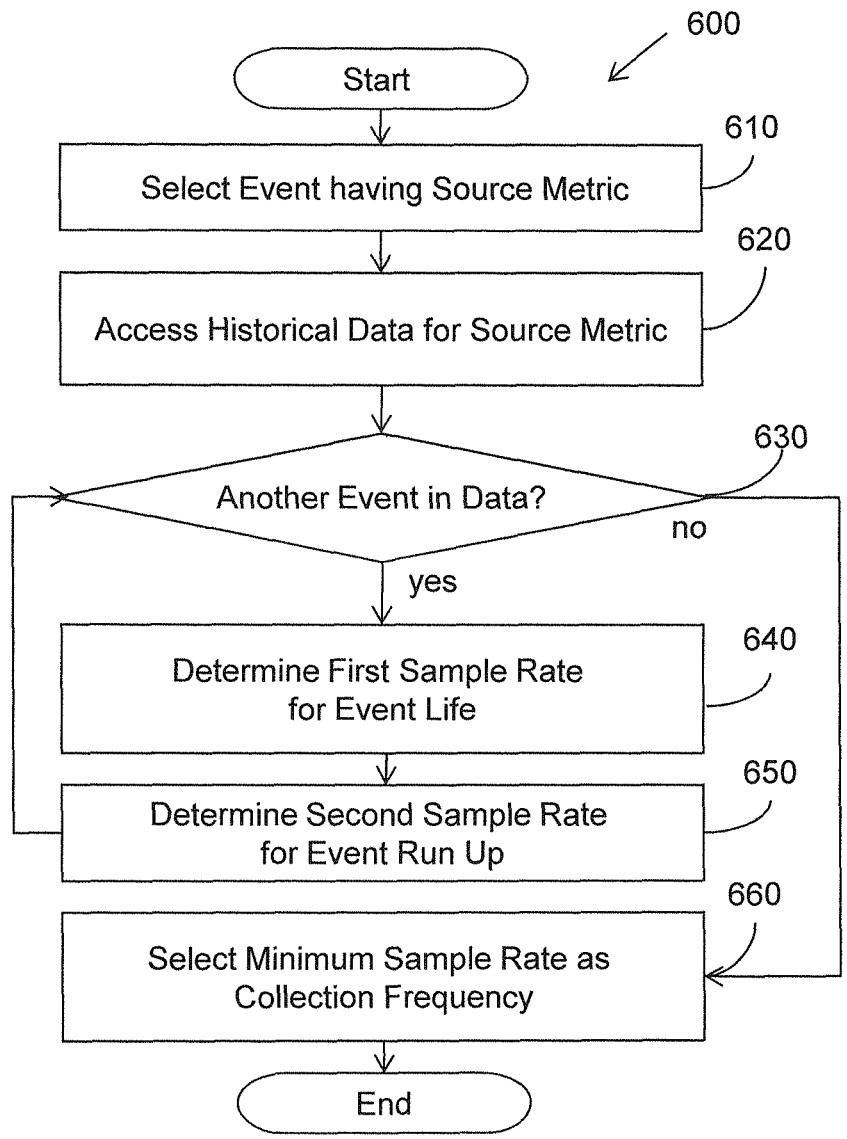
FIG. 6 illustrates another embodiment of a method associated with determination of recommended metric collection frequencies.

FIG. 6 illustrates one embodiment of a method 600 for recommending a collection frequency for metrics in an enterprise system. The method 600 may be performed by the frequency logic 420 of FIG. 4. The method includes, at 610, selecting an event having a source metric. At 620, the method includes accessing historical data for values of the source metric. At 630, the method determines if all events in the historical data have been processed. If not, for each remaining event the method includes determining a first collection frequency based, at least in part, on the duration of the event (i.e., the life of the event); and, at 650 determining a second collection frequency based, at least in part, on a time period between a maximum source metric value and a minimum source metric value in the event (i.e., the run up to the event). Once all events have been processed, at 660, the method includes selecting a minimum of the first collection frequency and the second collection frequency determined for all the events as the collection frequency for the metric. In one embodiment, a computing device is implemented with an executable algorithm that is configured to perform the method 500.

As can be seen from the foregoing description, the systems and methods described herein automatically recommend metrics and collection frequencies in a consistent manner. Having the right metrics collected at the correct level of granularity allows administrators, application architects, and engineers to efficiently diagnose problems in the production environment. The decisions about what metrics to collect, which targets to collect the metrics on, and at what frequency to collect metrics are no longer subjective. The process of setting up metric collection is streamlined and objective, providing a common framework for all stakeholders in an organization to agree upon.

Computer Embodiment

Figure 7:
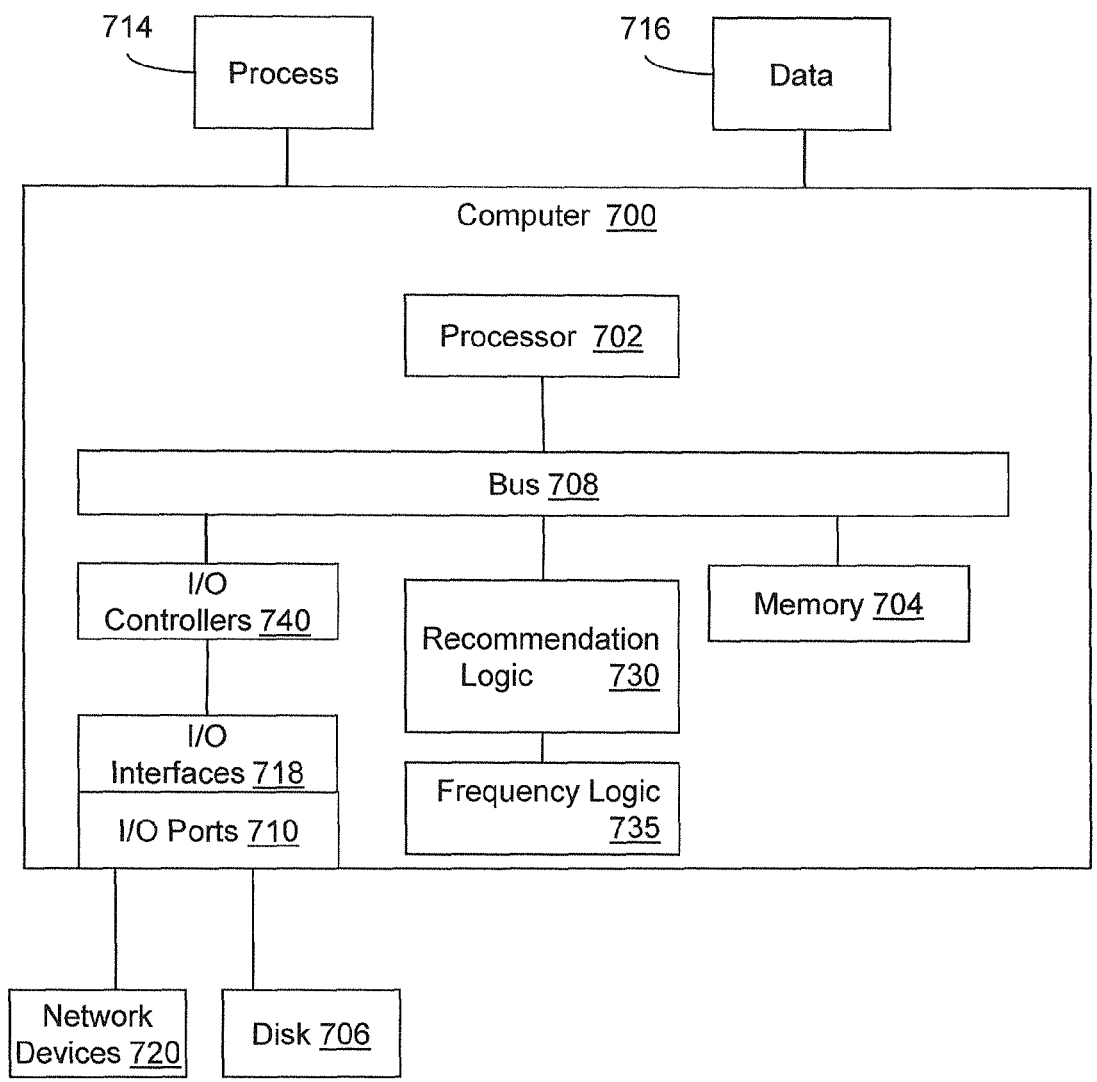
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 702, a memory 704, and input/output ports 710 operably connected by a bus 708. In one example, the computer 700 includes recommendation logic 730 configured to recommend metrics for collection in an enterprise system. The recommendation logic 730 is similar to the recommendation logic 110 and 410 described with respect to FIGS. 1-4 and in some embodiments performs the method 500 of FIG. 5. In different examples, the recommendation logic 730 may be implemented in hardware, a non-transitory computer-readable medium with stored instructions, firmware, and/or combinations thereof. While the recommendation logic 730 is illustrated as a hardware component attached to the bus 708, it is to be appreciated that in one example, the recommendation logic 730 could be implemented in the processor 702.

In one example, the computer 700 includes frequency logic 735 configured to recommend collection frequencies for metrics in an enterprise system. The frequency logic 735 is similar to the frequency logic 420 described with respect to FIG. 4 and in some embodiments performs the method 600 of FIG. 6. In different examples, the frequency logic 735 may be implemented in hardware, a non-transitory computer-readable medium with stored instructions, firmware, and/or combinations thereof. While the frequency logic 735 is illustrated as a hardware component attached to the bus 708, it is to be appreciated that in one example, the frequency logic 735 could be implemented in the processor 702.

In one embodiment, recommendation logic 730, frequency logic 735, or the computer is a means (e.g., hardware, non-transitory computer-readable medium, firmware) for performing the functions for automatically recommending metrics and collection frequencies for an enterprise system as described with respect to FIGS. 1-6.

The means may be implemented, for example, as an application specific integrated circuit (ASIC) programmed to perform the functions described with respect to FIGS. 1-6. The means may also be implemented as stored computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a compact disc-ROM (CD-ROM)

drive, a CD recordable (CD-R) drive, a CD rewritable (CD-RW) drive, a digital video disk (DVD) ROM, and so on. The memory 704 can store a process 714 and/or a data 716, for example. The disk 706 and/or the memory 704 can store an operating system that controls and allocates resources of the computer 700.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and universal serial bus (USB) ports.

The computer 700 can operate in a network environment and thus may be connected to the network devices 720 via the input/output (I/O) interfaces 718, and/or the I/O ports 710. Through the network devices 720, the computer 700 may interact with a network. Through the network, the computer 700 may be logically connected to remote computers. Networks with which the computer 700 may interact include, but are not limited to, a local area network (LAN), a wide area network (WAN), and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable storage medium", as used herein, is a non-transitory medium that stores instructions and/or data configured to perform one or more of the disclosed functions. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other media with which a computer, a processor, or other electronic device can function. Each type of media, if selected for implementation in one embodiment, includes stored instructions of an algorithm configured to perform one or more of the disclosed functions. Computer-readable storage media described herein are limited to statutory subject matter under 35 U.S.C §101.

"Logic", as used herein, includes a computer or electrical hardware, firmware, a non-transitory computer storage medium with stored instructions, and/or combinations of these configured to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, all of which are configured to perform one or more of the disclosed functions. Logic may include one or more gates, combinations of gates, or other circuit components configured to perform one or more of the disclosed functions. Where multiple logics are described, it may be possible to incorporate the multiple logics into one logic. Similarly, where a single logic unit is described, it may be possible to distribute that single logic unit between multiple logics. In one embodiment, one or more of these logics and corresponding structure associated with performing the disclosed and/or claimed functions. Choice of which type of logic to implement may be based on desired system conditions or specifications. Logic as described herein is limited to statutory subject matter under 35 U.S.C §101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable storage medium storing computer-executable instructions that when executed by a computing machine cause the computing machine to:
   store a domain knowledge catalog that defines, for each source metric of a plurality of source metrics:
   (i) a plurality of target type relationships, where a target type relationship comprises a collection of one or more target types that cooperate to instantiate a target in a system; and
   ii) for each target type relationship, a plurality of metrics that are related to the source metric, where the source metric comprises a measure of an attribute of a target;
   determine, for a particular system, a deployment topology that defines targets that are included in the system, where the deployment topology comprises a subset of the target type relationships;
   identify an event related to a selected source metric;
   select metrics for monitoring by:
      in accessing the domain knowledge catalog;
      (ii) selecting metrics that are related to the subset of target type relationships for the source metric; and
      (iii) determining a collection frequency for a metric based upon a minimum of a first collection frequency and a second collection frequency, where the first collection frequency is determined based at least in part on a duration of the event and where the second collection frequency is determined based at least in part on a time period between a first source metric value and a second source metric value in the event; and
   provide a recommendation to monitor the metrics selected for monitoring.

2. The non-transitory computer-readable storage medium of claim 1, where the functions further comprise determining the deployment topology using a target discovery process that automatically discovers targets and relationships between the targets in a system.

3. The non-transitory computer-readable storage medium of claim 1, where the target relationship type corresponds to a relationship between a first hardware computing device and a second hardware computing device and where the deployment topology defines a first target as the first hardware computing device and a second target as the second hardware computing device.

4. The non-transitory computer-readable medium of claim 1, where the functions further comprise determining the collection frequency for the metric based on historical data about the source metric.

5. The non-transitory computer-readable medium of claim 1, where
   the first source metric value comprises a maximum source metric value and the second source metric value comprises a minimum source metric value in the event.

6. The non-transitory computer-readable medium of claim 1, where the metric is related to a plurality of events associated with a plurality of source metrics, and where the functions further comprise:
   selecting a different event having a source metric related to the selected metric;
   determining additional first collection frequencies and additional second collection frequencies for the different source metric; and
   selecting a minimum of the first collection frequency, the second collection frequency, the additional first collection frequencies, and the additional second collection frequencies as the collection frequency for the metric.

7. The non-transitory computer-readable medium of claim 1, further comprising periodically accessing new historical data and, based on the new historical data, calculating a new first collection frequency, calculating a new second collection frequency, and selecting a new collection frequency for the metric based upon the new first collection frequency and the new second collection frequency.

8. A computing system, comprising:
   computer storage medium storing a domain knowledge catalog that defines, for each source metric of a plurality of source metrics:
      (i) a plurality of target type relationships, where a target type relationship comprises a collection of one or more target types that cooperate to instantiate a target in a system; and
      (ii) for each target type relationship, a plurality of metrics that are related to the source metric, where the source metric comprises a measure of an attribute of a target;
   recommendation logic configured to:
      determine, for a particular system, a deployment topology that defines targets that are included in the system, where the deployment topology comprises a subset of the target type relationships;
   identify an event related to a selected source metric;
   select metrics for monitoring by:
      (i) access the domain knowledge catalog;
      (ii) select metrics that are related to the subset of target type relationships for the source metric; and
      (iii) determine a collection frequency for a metric based upon a minimum of a first collection frequency and a second collection frequency, where the first collection frequency is determined based at least in part on a duration of the event and where the second collection frequency is determined based at least in part on a time period between a first source metric value and a second source metric value in the event; and
   provide a recommendation to monitor the metrics selected for monitoring.

9. The computing system of claim 8 where the recommendation logic is further configured to determine the deployment topology using a target discovery process that automatically discovers targets and relationships between the targets in a system.

10. The computing system of claim 8 further comprising frequency logic configured to determine the collection frequency for the metric based on historical data about the source metric.

11. The computing system of claim 8 where the first source metric value comprises
a maximum source metric value and the second source metric value comprises a minimum source metric value in the event.

12. The computing system of claim 8 where the frequency logic is further configured to determine the collection frequency by:
selecting a different event having a source metric related to the selected metric;
determining additional first collection frequencies and additional second collection frequencies for the different source metric; and
selecting a minimum of the first collection frequency, the second collection frequency, the additional first collection frequencies, and the additional second collection frequencies as the collection frequency for the metric.

13. The computing system of claim 8 where the frequency logic is further configured to periodically access new historical data and, based on the new historical data, calculate a new first collection frequency, calculate a new second collection frequency, and select a new collection frequency for the metric based upon the new first collection frequency and the new second collection frequency.

14. A computer-implemented method, comprising:
providing a domain knowledge catalog that defines, for each source metric of a plurality of source metrics:
(i) a plurality of target type relationships, where a target type relationship comprises a collection of one or more target types that cooperate to instantiate a target in an system; and
(ii) for each target type relationship, a plurality of metrics that are related to the source metric, where the source metric comprises a measure of an attribute of a target;
determining, for a particular system, a deployment topology that defines targets that are included in the system, where the deployment topology comprises a subset of the target type relationships; and
identifying an event related to a selected source metric; and
selecting metrics for monitoring by:
(i) accessing the domain knowledge catalog; and
(ii) selecting metrics that are related to the subset of target type relationships for the source metric; and
(iii) determining a collection frequency for a metric based upon a minimum of a first collection frequency and a second collection frequency, where the first collection frequency is determined based at least in part on a duration of the event and where the second collection frequency is determined based at least in part on a time period between a first source metric value and a second source metric value in the event; and
provide a recommendation to monitor the metrics selected for monitoring.

15. The computer-implemented method of claim 14, where the target relationship type corresponds to a relationship between a first hardware computing device and a second hardware computing device and where the deployment topology defines a first target as the first hardware computing device and a second target as the second hardware computing device.

16. The computer-implemented method of claim 14, where the domain knowledge catalog comprises a text document.

17. The computer-implemented method of claim 14, further comprising determining the collection frequency for the metric based on historical data about the source metric.

18. The computer-implemented method of claim 14 where the first source metric value comprises
a maximum source metric value and the second source metric value comprises a minimum source metric value in the event.

19. The computer-implemented method of claim 14, where the metric is related to a plurality of events associated with a plurality of source metrics, and where the method further comprises:
selecting a different event having a source metric related to the selected metric;
determining additional first collection frequencies and additional second collection frequencies for the different source metric; and
selecting a minimum of the first collection frequency, the second collection frequency, the additional first collection frequencies, and the additional second collection frequencies as the collection frequency for the metric.

20. The computer-implemented method of claim 14, further comprising periodically accessing new historical data and, based on the new historical data, calculating a new first collection frequency, calculating a new second collection frequency, and selecting a new collection frequency for the metric based upon the new first collection frequency and the new second collection frequency.

* * * * *

UNITED STATES PATENT AND TRADEMARK OFFICE
CERTIFICATE OF CORRECTION

PATENT NO. : 9,755,925 B2  
APPLICATION NO. : 14/486168  
DATED : September 5, 2017  
INVENTOR(S) : Poola et al.

Page 1 of 1

It is certified that error appears in the above-identified patent and that said Letters Patent is hereby corrected as shown below:

In the Drawings

On sheet 3 of 7, in FIG. 3, under Server C, Line 3, delete "Databasee" and insert -- Database --, therefor.

In the Specification

In Column 6, Lines 38-39, delete "the the" and insert -- the --, therefor.

In the Claims

In Column 11, Line 42, in Claim 1, before "accessing", delete "in" and insert -- (i) --, therefor.

Signed and Sealed this  
Twenty-ninth Day of May, 2018

Andrei Iancu  
*Director of the United States Patent and Trademark Office*